April 10, 1928. 1,665,767
F. T. BOOKMYER
SWINGING CARRIER FOR CORN SHOCKERS
Filed March 20, 1925  2 Sheets-Sheet 1

Inventor
Frank T. Bookmyer
By
Clarence O'Brien
Attorney

April 10, 1928. 1,665,767
F. T. BOOKMYER
SWINGING CARRIER FOR CORN SHOCKERS
Filed March 20, 1925 2 Sheets-Sheet 2
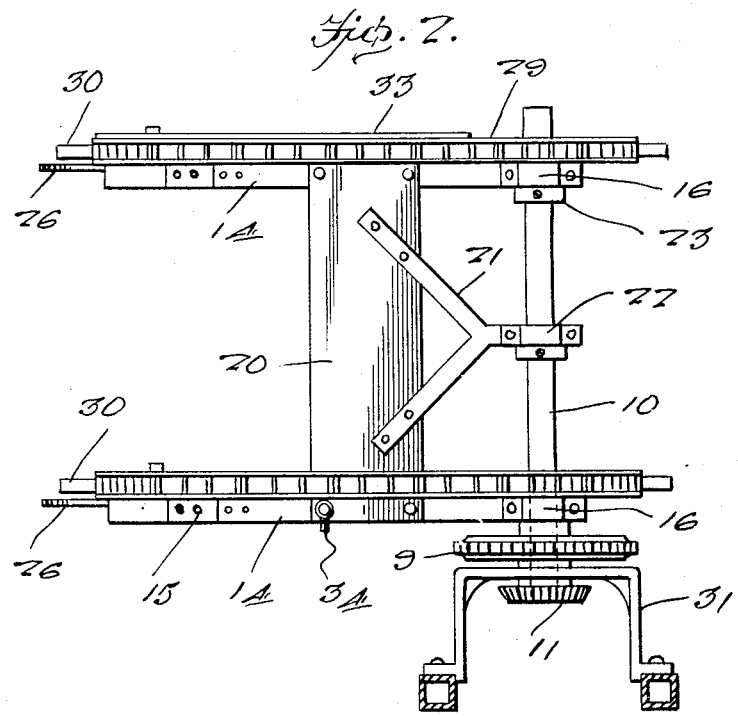
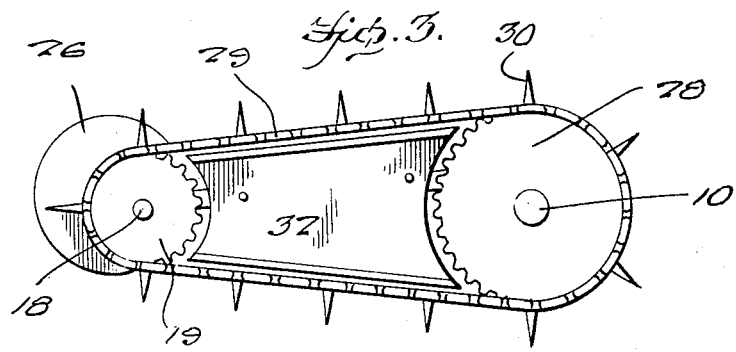
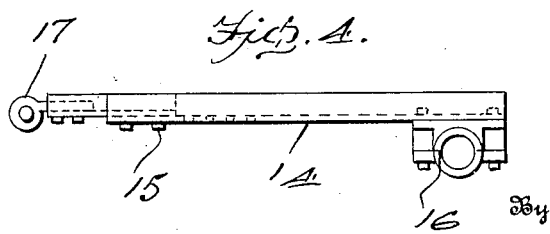
Inventor
Frank T. Bookmyer
By
Attorney Patented Apr. 10, 1928.

1,665,767

UNITED STATES PATENT OFFICE.

FRANK T. BOOKMYER, OF MARION, OHIO.

SWINGING CARRIER FOR CORN SHOCKERS.

Application filed March 20, 1925. Serial No. 17,000.

The present invention relates generally to improvements in corn shockers and aims to provide a swinging carrier for delivering the corn stalks to the center of a revolving platform, said carrier swinging away from the center as the shock is being formed.

An important object of the invention is to provide a swinging carrier of this nature which may be readily incorporated with conventional parts of the corn shocker and which will prove efficient and reliable in operation.

With the above and numerous other objects in view as will appear as the description proceeds, the invention resides in certain novel features of construction, and in the combination and arrangement of parts as will be hereinafter more fully described.

In the drawing:—

Figure 2 is an enlarged side elevation of the swinging carrier.

Figure 3 is a top plan view thereof, and

Figure 4 is a detail view of one of the rails thereof.

Figure 1:
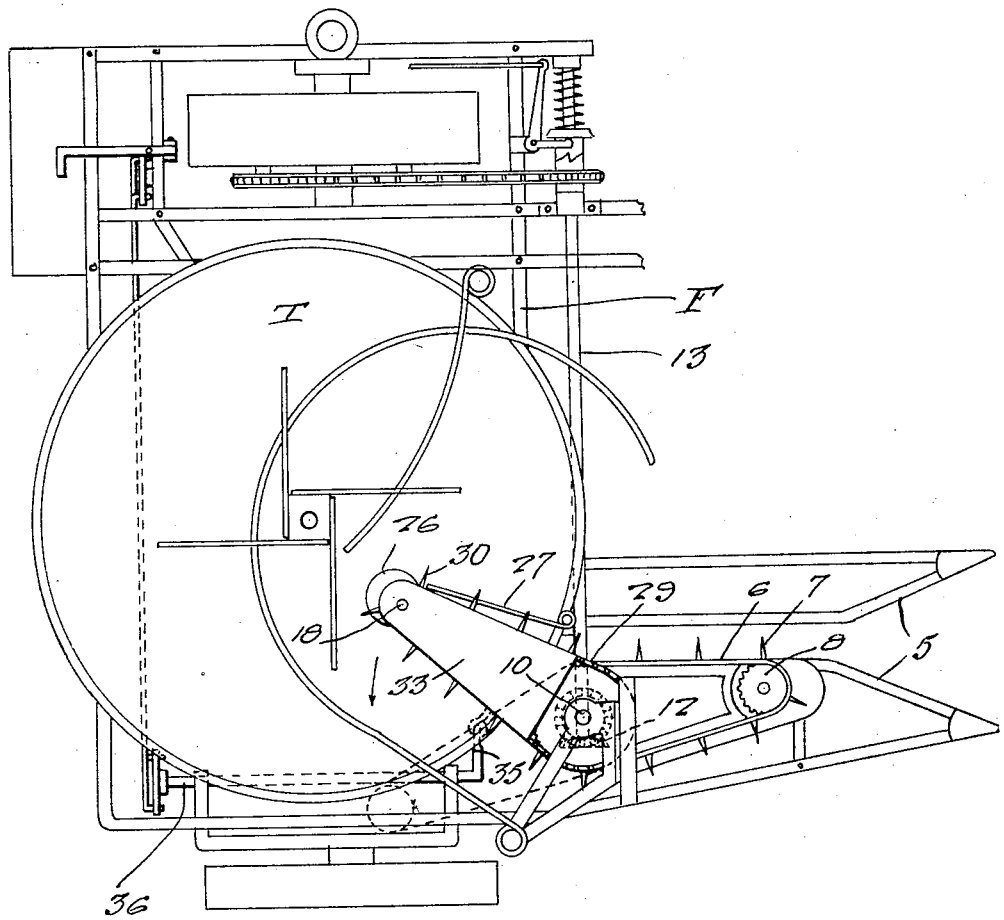
Figure 1 is a top plan view of a corn shocker showing my improved swinging carrier associated therewith.

Referring to the drawings in detail, it will be seen that the corn shocker which I have disclosed in Figure 1 is of the well known type and includes the usual frame F having the turn table T thereon which rotates slowly in a clockwise direction, being driven in any suitable or well known manner.

The guides 5 for the corn stalks are of the usual type and the stalks are delivered by a chain 6 having the spikes 7 thereon. This chain is trained about a sprocket 8 and a sprocket 9 on shaft 10. This shaft 10 has a beveled gear 11 on its bottom end which is driven by a beveled gear 12 on the shaft 13 rotated in any suitable manner as the shocker travels along. My swinging carrier is mounted on the vertically disposed shaft 10, and includes a frame structure comprising the upper and lower rails 14 which are adjustable as to their length as at 15 and are provided with front bearings 16 for receiving the shaft 10 and rear bearings 17 for receiving stub shafts 18 of sprockets 19. A plate 20 holds the rails 14 in their vertically spaced disposition as shown in Figure 2, and a bracket 21 is connected thereto and terminates in a journal 22 registering with the journals 16 for receiving the shaft 10. Collars 23 are fixed onto the shaft 10, one below each journal 16, 22. So that the carrier is capable of swinging across the table so that its ends with the bearings 17 may be adjusted at different distances from the center of the platform T as the shock grows thereon. Rounded guards 26 project from the rails 14 beyond the periphery of the sprocket 19 so that the stalks will not engage with the sprockets as they come to the end of the carrier. The stalks are held against the carrier by suitable fingers 27. Sprockets 28 are carried by the shaft 10, one immediately above each bearing 16. Chains 29 are trained over the sprockets 19 and 28 and are provided with prongs 30. The shaft 10 is journaled between the sprocket 9 and beveled gear 11 in a supporting bracket 31. A guard 32 is mounted on the upper rail 14 to support a suitable fender cover 33 so as to prevent the stalks from clogging the chains and sprockets. By adjusting the length of the rails 14, the chains 29 can be adjusted.

A link 34 is engaged with the lower rail 14 and also to the end of a crank 35 on shaft 36 which through suitable means controlled by the operator may be actuated to urge the free end of the carrier toward the center of the platform.

As the shocker moves forwardly the stalks will be received between the guides 5 and urged toward the shocking mechanism by the chain 6 and a suitable cutting mechanism (not shown) will sever the bottom or root portions thereof and the stalks will then be delivered to the swinging carrier which will deliver them to the center of the platform T. As the shock grows on this platform, the swinging carrier will be forced in the direction indicated by the arrow in Figure 1 and finally take the dotted line position shown in this figure. By actuating the shaft 36 in any suitable manner it will be seen that this movement of the swinging carrier may be resisted and therefore the shock will be packed tightly.

It is thought that the construction and operation of this swinging carrier will now be clearly understood by those skilled in this art and familiar with the type of shocker which I have indicated more or less diagrammatically in the accompanying drawings. It is desired, however, to point out that the present embodiment of the invention has been disclosed merely by way of example and that numerous changes in the details of construction, in the size, and in the combination and arrangement of parts may be resorted to without departing from the spirit or scope of the invention as hereinafter claimed or sacrificing any of its advantages.

Having thus described the invention, what I claim as new is:—

A swinging carrier for corn shockers comprising a vertical shaft adapted to be journaled in the frame of the shocker, a pair of shafts mounted in spaced relation on the vertical shaft, a rectangular plate between the intermediate portions of the carrier in spaced relation to the shaft, and having its longitudinal dimension vertically disposed, a rail on the upper end of the plate and extending beyond both sides thereof, a second rail on the lower end of the plate and extending beyond both sides thereof, said rail being disposed horizontally, bearings on the forward ends of the rails for receiving the vertical shaft, a bracket extending from the plate and terminating in a bearing for receiving the vertical shaft between the sprockets, a collar on the vertical shaft below the bearing of the bracket, a sprocket journaled on the other end of each rail, chains trained over the sprockets on the brackets and the sprockets on the vertical shaft, spikes extending from the chains, means for urging the free ends of the rails toward the center of the table of the shocker, and a spring adapted to be mounted on the shocker for urging the stalks in engagement with the spikes and the chain.

In testimony whereof I affix my signature.

FRANK T. BOOKMYER.